United States Patent
Tsengas

(10) Patent No.: US 6,550,426 B2
(45) Date of Patent: *Apr. 22, 2003

(54) PET TOY

(76) Inventor: Steven Tsengas, 7768 Litchfield Dr., Mentor, OH (US) 44060

(*) Notice: Subject to any disclaimer, the term of this patent is extended or adjusted under 35 U.S.C. 154(b) by 0 days.

This patent is subject to a terminal disclaimer.

(21) Appl. No.: 09/802,749

(22) Filed: Mar. 8, 2001

(65) Prior Publication Data

US 2001/0027754 A1 Oct. 11, 2001

Related U.S. Application Data

(63) Continuation-in-part of application No. 09/479,001, filed on Jan. 7, 2000, now Pat. No. 6,371,053.
(60) Provisional application No. 60/115,176, filed on Jan. 8, 1999.

(51) Int. Cl.$^7$ .......................... A01K 29/00; A63H 3/28
(52) U.S. Cl. ....................................... 119/707
(58) Field of Search ........................... 119/707, 709; 446/297, 302, 397

(56) References Cited

U.S. PATENT DOCUMENTS

| | | |
|---|---|---|
| 1,265,926 A | 5/1918 | Ludlam |
| 3,904,210 A | 9/1975 | Licitis |
| 3,935,669 A | 2/1976 | Potrzuski et al. |
| 4,249,338 A | 2/1981 | Wexler |
| 4,318,245 A | 3/1982 | Stowell et al. |
| 4,391,224 A | 7/1983 | Adler |
| 4,551,114 A | 11/1985 | Hyman et al. |
| 4,602,360 A | 7/1986 | Porcelli |
| 4,662,260 A | 5/1987 | Rumsey |
| 4,712,510 A | 12/1987 | Tae-Ho |
| 5,046,986 A | 9/1991 | Wood et al. |
| 5,119,001 A | 6/1992 | Moore et al. |
| 5,221,225 A * | 6/1993 | Newbold et al. ........... 446/297 |
| 5,370,223 A | 12/1994 | Leicht, Jr. |
| 5,390,629 A | 2/1995 | Simone |
| 5,517,948 A | 5/1996 | Udelle et al. |
| 5,533,920 A | 7/1996 | Arad et al. |
| 5,542,376 A | 8/1996 | Udelle et al. |
| 5,575,240 A | 11/1996 | Udelle et al. |
| 5,609,508 A | 3/1997 | Wingate |
| 5,634,436 A | 6/1997 | Coombs et al. |
| 5,657,721 A | 8/1997 | Mayfield et al. |
| 5,673,651 A | 10/1997 | Udelle et al. |
| 5,679,049 A | 10/1997 | Arad et al. |
| 5,743,215 A | 4/1998 | Zeff |
| 5,785,005 A | 7/1998 | Udelle et al. |
| 5,794,568 A | 8/1998 | Udelle et al. |
| 5,875,736 A | 3/1999 | Udelle et al. |
| 5,876,263 A | 3/1999 | DeCesare et al. |
| 5,934,223 A | 8/1999 | Ellery-Guy |
| 5,975,982 A | 11/1999 | Spector |
| 5,989,091 A * | 11/1999 | Rodgers .................. 446/297 X |
| 6,000,987 A | 12/1999 | Belin et al. |
| 6,039,628 A | 3/2000 | Kusmiss et al. |
| 6,058,887 A | 5/2000 | Silverman |
| 6,193,580 B1 * | 2/2001 | Albert et al. ............. 4466/297 |
| 6,196,893 B1 | 3/2001 | Casola et al. |

OTHER PUBLICATIONS

Silly Slammers. Datasheet (online). Gibson Greetings, Inc. Corporation. Retrieved from the Internet: <URL: http://members.aol.com/ToyExchange/SillySlammers/SillySlammers.htm>. On sale at least as early as Oct. 15, 1997).

* cited by examiner

Primary Examiner—Robert P. Swiatek

(57) ABSTRACT

A pet toy having a sound device that senses play induced motion and plays an appropriate sound to encourage the pet to continue to play with the pet toy. In one embodiment, the pet toy includes an outer cover having a shape which simulates a natural prey of the pet, such as a mouse or a bird for a cat toy and the sound device emits a sound which simulates the natural sound of the selected prey. In another embodiment, the pet toy includes a sound device capable of recording personalized messages by the pet owner for the pet to listen when playing with the pet toy during the absence of the owner.

16 Claims, 5 Drawing Sheets

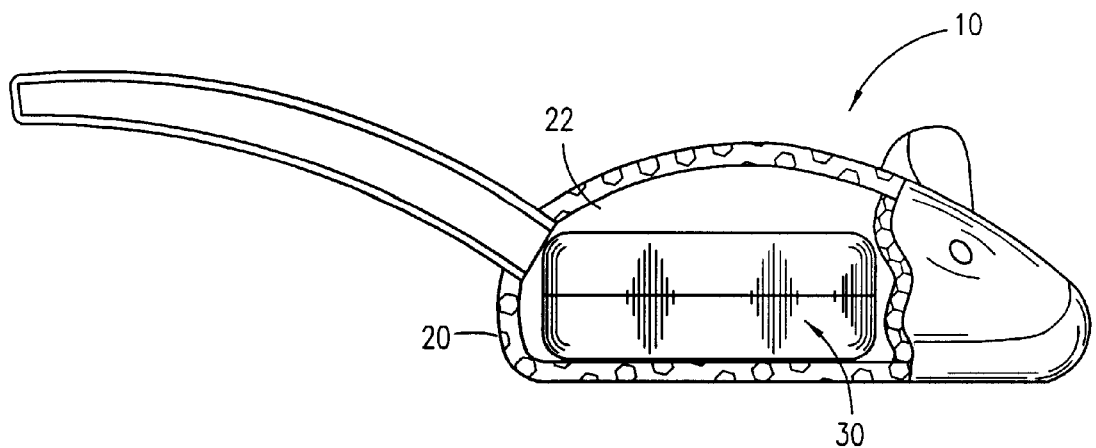
*Fig. 1A*
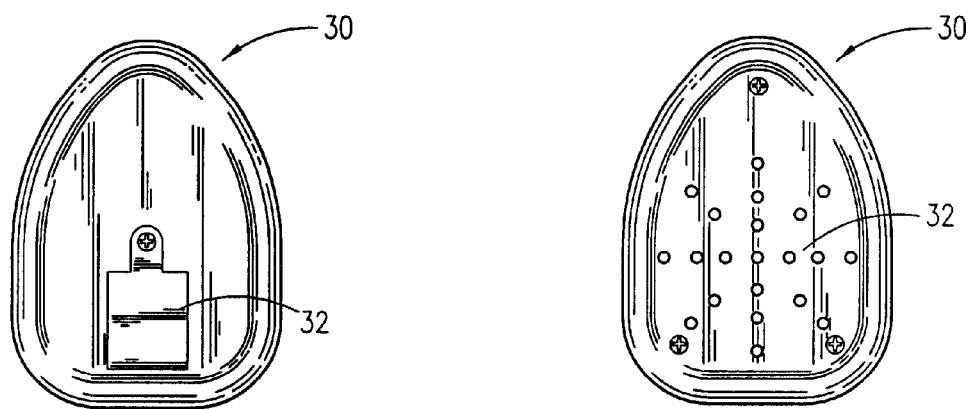
*Fig. 2*  *Fig. 3*

PET TOY

This application is a continuation-in-part of prior application Ser. No. 09/479,001, filed Jan. 7, 2000 now U.S. Pat. No. 6,371,053. This application claims the benefit of U.S. Provisional application No. 60/115,176 filed Jan. 8, 1999. Application Ser. Nos. 09/479,001 and 60/115,176 are hereby incorporated by reference.

BACKGROUND OF THE INVENTION

The present invention relates generally to pet toys and more particularly, to a pet toy including a motion responsive sound device.

Pets, such as, for example, cats and dogs, which spend the majority of their time indoors, are becoming increasingly popular. In addition, due to the increasingly busy schedules of their owners, such pets are spending an increasing amount of time alone indoors when their owners are not present. While having healthy and happy pets is an objective of virtually every pet owner, the ability of pet owners to exercise and play with their pets is sometimes limited due to a lack of time and energy on behalf of the pet owner.

Many different devices have been developed to assist pet owners in keeping their pets happy and healthy. Such devices can be seen in numerous pet stores and catalogs. Different types of balls, bones and other such toys can be purchased by the owner to be used by their pets for exercise and enjoyment. However, pets tend to quickly lose interest in such devices and thus, the pets do not benefit from exercise and enjoyment from such devices when they are not used by the pets.

The foregoing illustrates limitations known to exist in present pet toys. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a pet toy comprising an outer cover having an interior cavity; and an electronic sound device emitting a sound in response to movement of the pet toy, the sound device being positioned within the outer cover interior cavity. In one embodiment of the present invention, the outer cover simulates the appearance of a natural prey of the pet, such as a mouse or small bird and the sound device emits a pre-recorded sound that simulates the sound of the selected natural prey, such as squeaking or chirping. In another embodiment of the present invention, the outer cover has the shape of an object familiar to the pet, such as a football or large bone and the sound device is capable of recording personal messages from the pet's owner so that the pet can hear his owner's voice when playing with pet toy.

The foregoing and other aspects will become apparent from the following detailed description of the invention when considered in conjunction with the accompanying drawing figures.

BRIEF DESCRIPTION OF THE DRAWING FIGURES

FIG. 1A is a side view of the pet toy shown in FIG. 1, with a portion of the outer cover removed;

FIG. 2 is a top view of a sound device enclosed in the pet toy shown in FIG. 1;

FIG. 3 is a bottom view of the sound device shown in FIG. 2;

DETAILED DESCRIPTION

Figure 1:
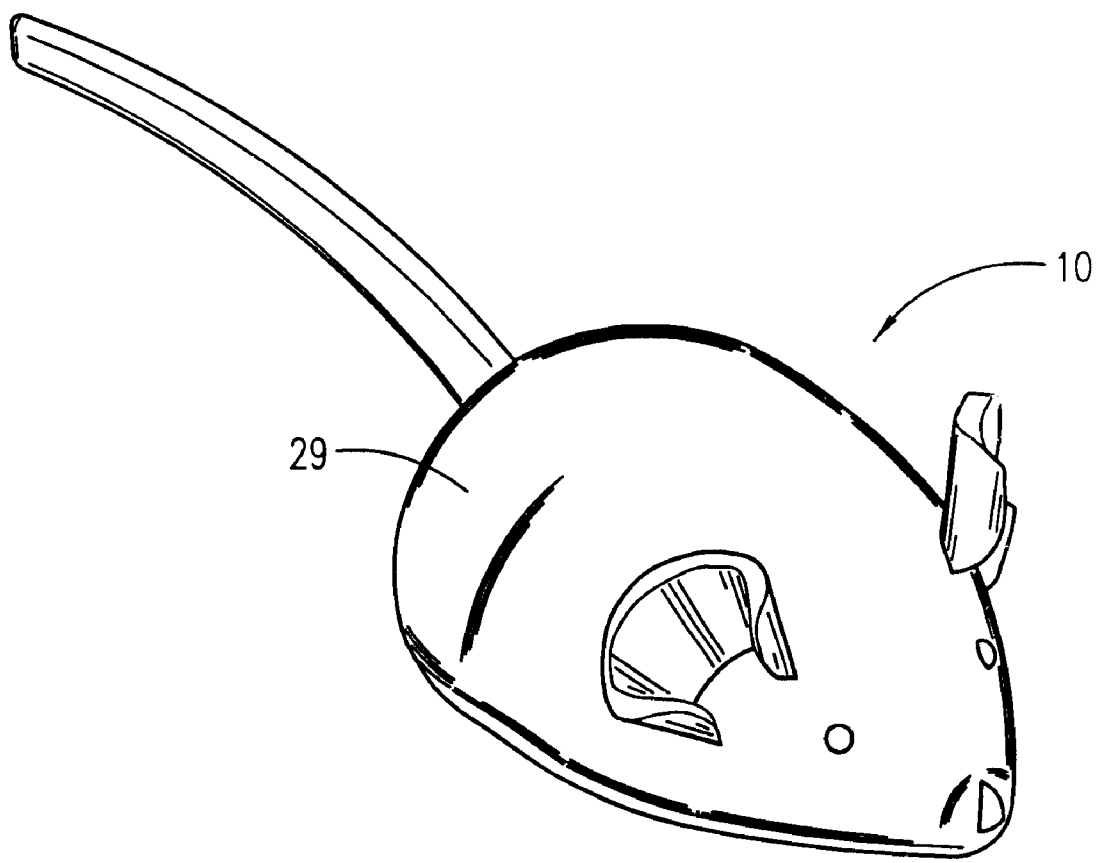
FIG. 1 is a perspective view of a first embodiment of a pet toy incorporating the present invention.
Figure 4:
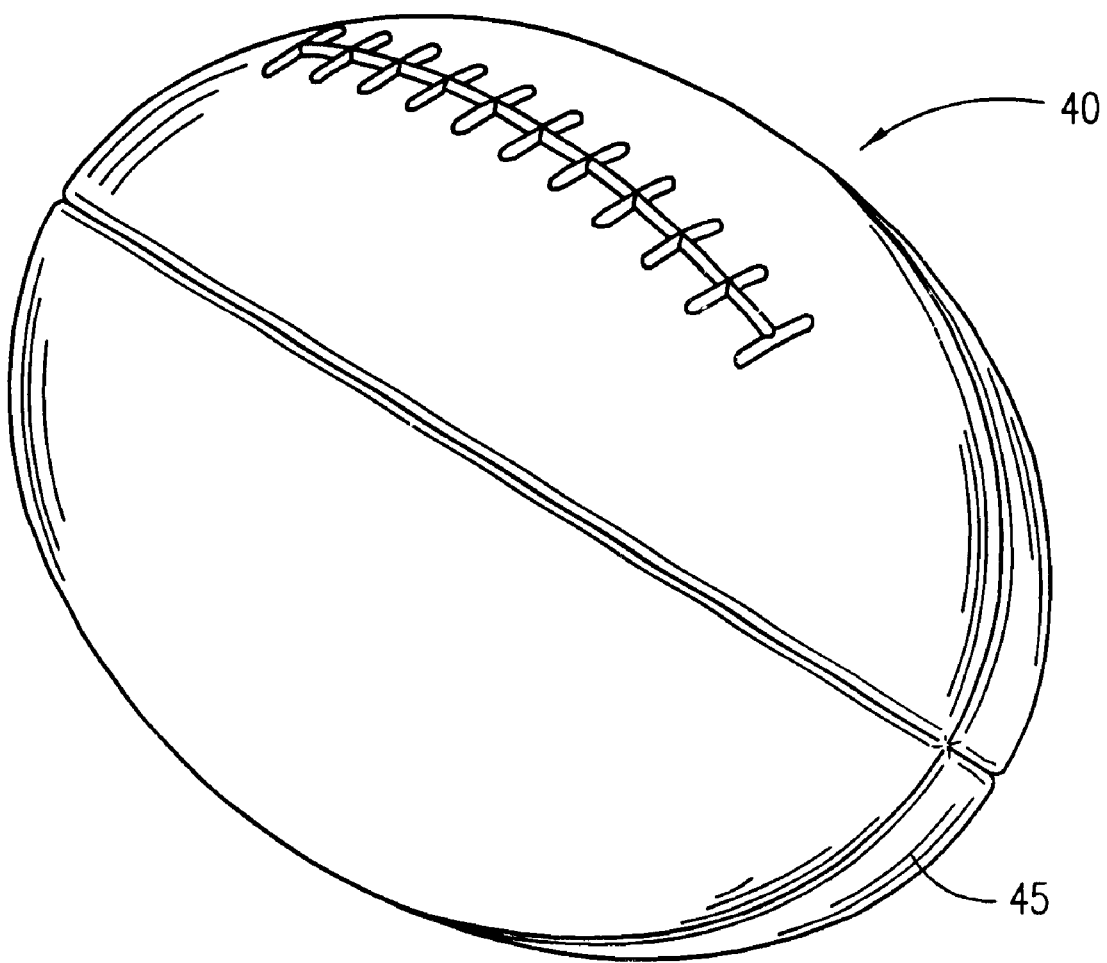
FIG. 4 is a perspective view of a second embodiment of a pet toy incorporating the present invention.
Figure 5:
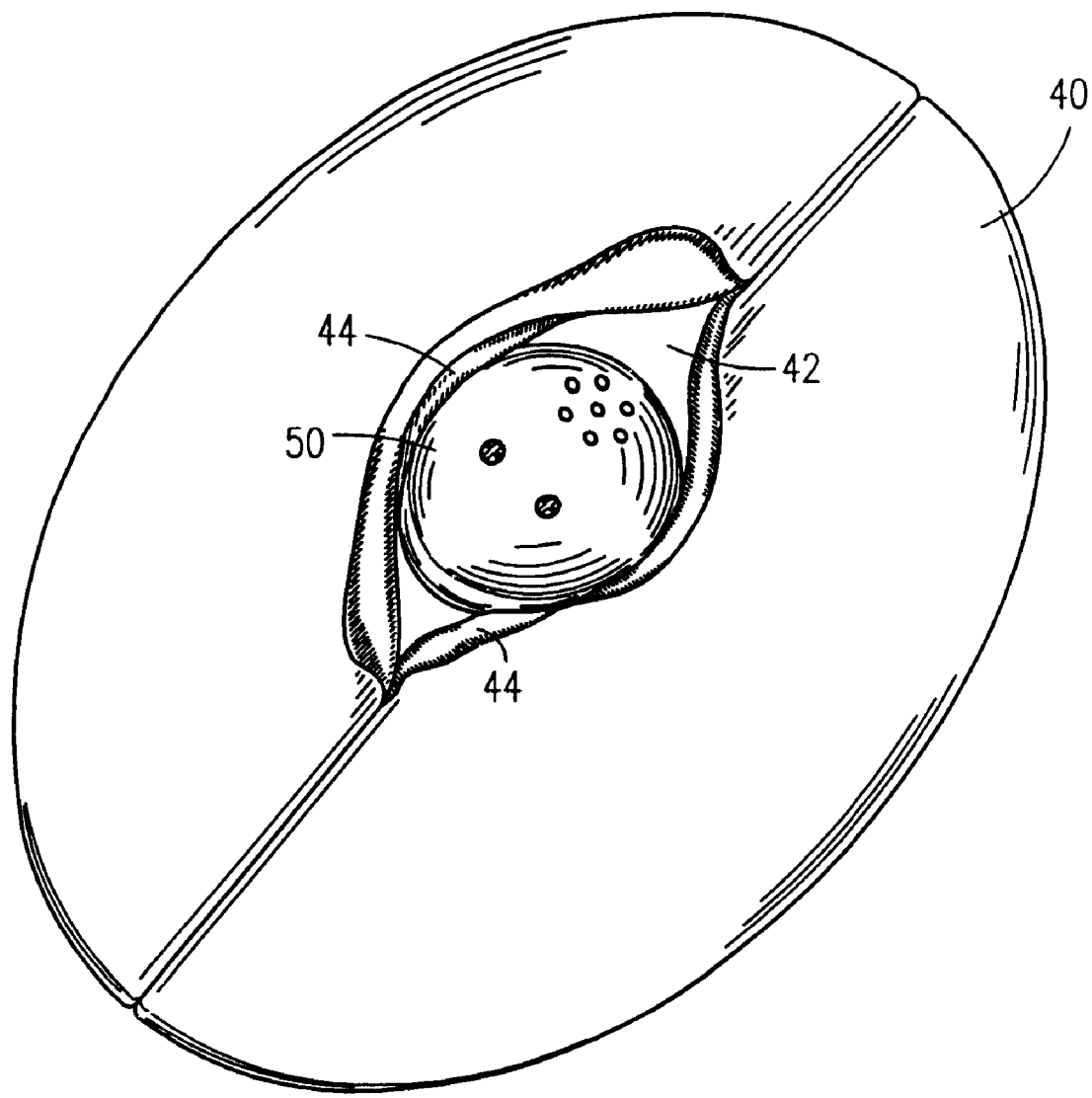
FIG. 5 is a second perspective view of the pet toy shown in FIG. 5, illustrating the resealable enclosure for holding a sound device.

FIGS. 1 through 3 show a first embodiment of a pet toy incorporating the present invention. The pet toy 10 is a simulated mouse toy having an electronic prerecorded sound device 30. Pet toy 10 includes an outer cover 20 simulating a mouse and having an interior cavity 22 for holding the sound device 30. Outer cover 20 is preferably fabricated from a relatively soft, yet durable, textile material with filling or stuffing and has the outward appearance of a mouse. Sound device 30 includes a shaker barrel activator, a prerecorded sound chip and a source of electrical power, such as a battery. If desired, catnip or other pet attractive scent material can be placed in the interior cavity 22 of outer cover 20 and the catnip, along with the outward appearance of outer cover 20, will attract pets, such as, for example, cats. Other shapes, in addition to a mouse, can be used for the pet toy 10. Preferably, these shapes simulate natural prey animals for the pet, such as mice, birds, etc. Other shapes, including arbitrary shapes, such as a ball, bone, football, fish, monkey, etc. can be used.

Sound device 30 preferably emits a prerecorded sound in response to movement of sound device 30. Thus, when a pet, such as a cat, swats pet 10, a prerecorded sound is activated. This prerecorded sound can be a "permanent" prerecorded sound such as an animal's voice, such as "meow" or "purr," a beeping sound, a human voice, laughter, such as "ha, ha, ha" or some other desired sound, or can be recorded, and re-recorded, as desired, by the user. The prerecorded sound may continues for a predetermined time period, for example five (5) seconds, and then stops or may continue as long as the sound device is sensing motion of pet toy 10. Preferably, when the outer cover 20 simulates the shape of a natural prey of the pet, the pre-recorded sound is a simulated sound made by the natural prey, i.e., squeak for a mouse or chirp for a bird.

As shown in FIGS. 2 and 3, the sound device includes a battery compartment 32 holding a plurality of replaceable batteries. Preferably, a shipping pull tab (not shown) is inserted between the batteries to prevent activation of the sound device prior to being placed into use by the pet's owner. Sound device 30 also includes a speaker (not shown) positioned within the housing of sound device 30. When the speaker is positioned within a housing, a plurality of speaker holes 34 are provided to better allow the sound to propagate from within the housing.

FIGS. 4 through 7 show a second embodiment of a pet toy incorporating the present invention. The pet toy 40 is a soft football having an electronic sound device 50. Pet toy 40 includes an outer cover 45 in the shape of a football and having an interior cavity 42 for holding the sound device 50. Outer cover includes a resealable opening 44 for permitting access to sound device 50. Preferably, resealable opening 44 is closed using a snap fastener and Velcro® brand separable fasteners. Outer cover 45 is preferably fabricated from a relatively soft, yet durable, textile material with filling or stuffing and has the outward appearance of a football. Sound device 50 includes a motion sensor, a recordable sound chip and a source of electrical power, such as a battery. Other shapes, in addition to a football, can be used for the pet toy 40.

Figure 6:
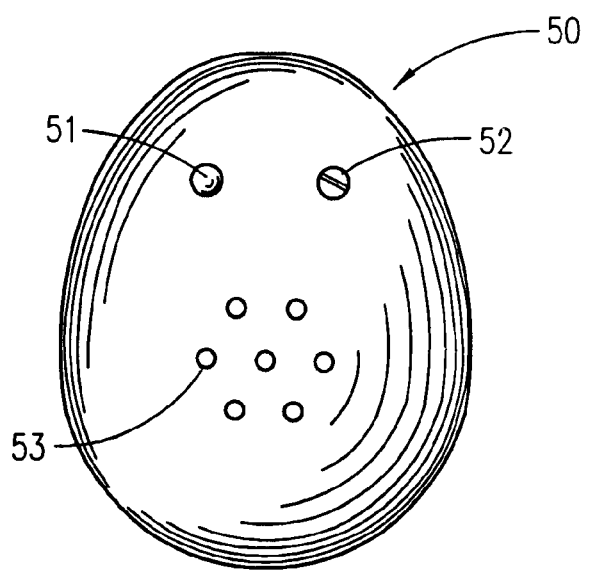
FIG. 6 is a top view of a second embodiment of a sound device enclosed in the pet toy shown in FIG. 4.
Figure 7:
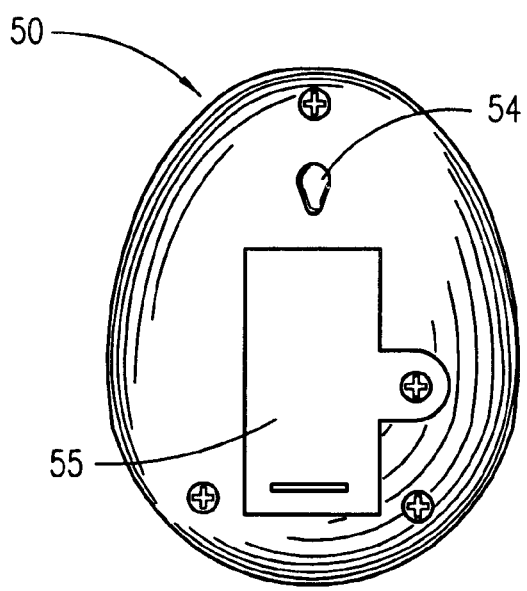
FIG. 7 is a bottom view of the sound device shown in FIG. 6.

As shown in FIGS. 6 and 7, the sound device 50 includes a battery compartment 55 holding a plurality of replaceable batteries. Sound device 50 also includes a speaker (not shown) positioned within the housing of sound device 50. When the speaker is positioned within a housing, a plurality of speaker holes 53 are provided to better allow the sound to propagate from within the housing. Sound device 50 also includes the necessary features to allow the pet owner to record a message for their pet, such as "Good girl" or "Daddy will be home soon." Sound device 50, therefore, includes a microphone 52, a record activation button 54 and a recording indication light 51. To record a message, the pet owner opens the resealable opening 44 and removes the electronic sound device 50. Next, the record activation button 54 is pressed and held until the recording indication light 51 illuminates. Once recording indication light is lit, the pet owner begins speaking and sound device 50 records the pet owner's message. Upon completion of their personal pet message, the pet owner releases record activation button 54. The sound device 50 is re-inserted into interior cavity 42 and resealable opening 44 is sealed. When the pet, usually a dog for this embodiment, plays with pet toy 40, sound device 50 senses the motion and plays the owner's personal message for the pet.

Having described the invention, what is claimed is:

1. A pet toy comprising:
    an outer cover having an interior cavity; and
    an electronic sound device responsive to commencement of and continuation of movement of said pet toy, said sound device emitting a sound in response to commencement of and continuation of movement of said pet toy, said sound device being positioned within said interior cavity, said sound device including at least one pre-recorded sound, said sound device including the capability to record sounds.
2. The pet toy according to claim 1, wherein said interior cavity includes a resealable opening.
3. The pet toy according to claim 1, wherein said outer cover has an appearance simulating a natural pet prey and said sound emitted by said sound device simulates at least one sound emitted by said natural pet prey.
4. The pet toy according to claim 1, wherein said electronic sound device includes a battery.
5. The pet toy according to claim 4, wherein said battery is replaceable.
6. A pet toy comprising:
    an outer cover having an interior cavity; and
    an electronic sound device responsive to commencement of and continuation of movement of said pet toy, said sound device emitting a sound in response to commencement of and continuation of movement of said pet toy, said sound device being positioned within said interior cavity, said sound device including at least one pre-recorded sound, said sound device including the capability to record sounds; and
    a pet attractive scent material positioned within the outer cover interior cavity.
7. The pet toy of claim 6, wherein said interior cavity includes a resealable opening.
8. The pet toy according to claim 6, wherein said outer cover has an appearance simulating a natural pet prey and said sound emitted by said sound device simulates at least one sound emitted by said natural pet prey.
9. The pet toy of claim 6 wherein said pet attractive scent material is cat-nip.
10. The pet toy of claim 6, wherein said electronic sound device includes a battery.
11. The pet toy of claim 6, wherein said battery is replaceable.
12. A pet toy comprising:
    an outer cover having an interior cavity; and
    an electronic sound device responsive to commencement of and continuation of movement of said pet toy, said sound device emitting a sound in response to commencement of and continuation of movement of said pet toy, said sound device being positioned within said interior cavity, said sound device including at least one pre-recorded sound, said sound device including the capability to record sounds; and
    a pet attractive scent material positioned within the outer cover interior cavity, wherein said pet attractive scent material is cat-nip.
13. The pet toy of claim 12, wherein said interior cavity includes a resealable opening.
14. The pet toy according to claim 12, wherein said outer cover has an appearance simulating a natural pet prey and said sound emitted by said sound device simulates at least one sound emitted by said natural pet prey.
15. The pet toy of claim 12, wherein said electronic sound device includes a battery.
16. The pet toy of claim 12, wherein said battery is replaceable.

* * * * *